United States Patent [19]

Shinmura et al.

[11] Patent Number: 5,124,801
[45] Date of Patent: Jun. 23, 1992

[54] MANUAL IMAGE COPIER WITH A SPECIFIC STRUCTURE HOUSING A SPECIFIC COPY SHEET CARRYING PATH, DRAWING UTENSIL CARRIAGE, AND DRIVE MECHANISM THEREOF

[75] Inventors: Fujio Shinmura, Hamamatsu; Seiji Tsuchiya, Yamanashi, both of Japan

[73] Assignees: Roland DG Corporation, Shizuoka; Nisca Corporation, Yamanashi, both of Japan

[21] Appl. No.: 723,328

[22] Filed: Jun. 28, 1991

[30] Foreign Application Priority Data

Jun. 30, 1990 [JP] Japan .................. 2-173881

[51] Int. Cl.$^5$ .............. H04N 1/23; H04N 1/21; B41J 3/39
[52] U.S. Cl. .............. 358/296; 358/473; 346/139 A; 346/143
[58] Field of Search ........... 358/296, 473; 346/143, 346/139 A, 139 C, 140 A; 400/88, 193

[56] References Cited

U.S. PATENT DOCUMENTS

| | | | |
|---|---|---|---|
| 4,701,804 | 10/1987 | Toyoda | 358/473 |
| 4,868,676 | 9/1989 | Matsuura | 358/296 |
| 5,019,918 | 5/1991 | Kubota | 358/473 |

FOREIGN PATENT DOCUMENTS 61-32183 2/1986 Japan .

*Primary Examiner*—Benjamin R. Fuller
*Assistant Examiner*—Scott A. Rogers
*Attorney, Agent, or Firm*—Sandler, Greenblum & Bernstein

[57] ABSTRACT

This invention relates to a handy sketching apparatus which has an image information reading function and a sketching function to draw an image on the basis of the image information read by the image information reading function, and which is easy to operate and easy to be miniaturized for smaller size.

The handy sketching apparatus comprises a base block containing a progressive scanning image information reading mechanism through the bottom face, a sheet carrying path provided on the top side of the base block so as to carry a sheet in a specified direction substantially parallel to the bottom face of the base block, and an upper block integrally formed on the top side of the base block, straddling the sheet carrying path. The image information reading mechanism reads image information placed under the base block sequentially as the apparatus is moved in a sub-scanning direction. The upper block houses a traveling mechanism which is run back and forth in a main scanning direction across the sheet carrying path, thereby moving a drawing utensil to draw an image on the sheet on the sheet carrying path, on the basis of the image information read by the image information reading mechanism.

10 Claims, 4 Drawing Sheets

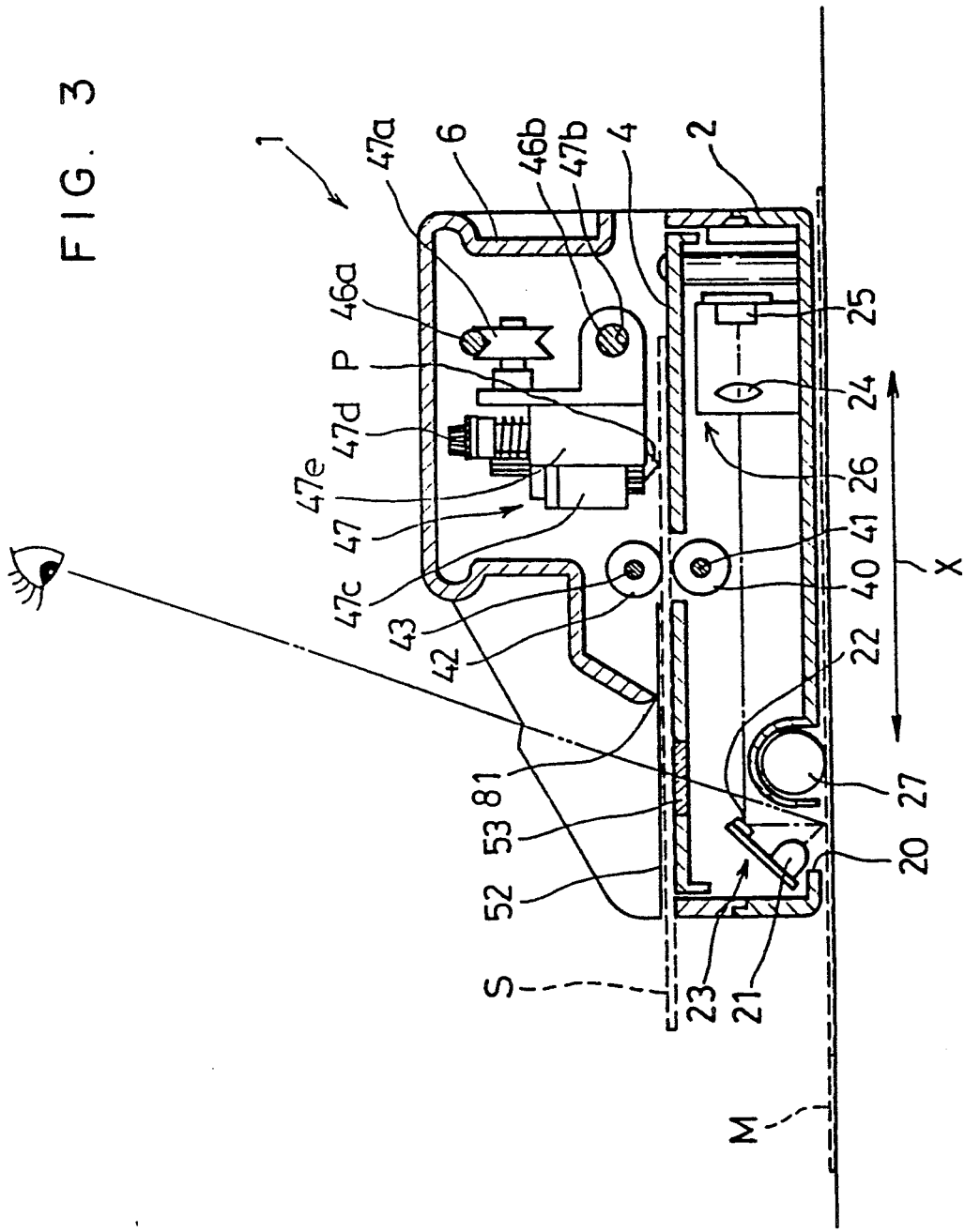

MANUAL IMAGE COPIER WITH A SPECIFIC STRUCTURE HOUSING A SPECIFIC COPY SHEET CARRYING PATH, DRAWING UTENSIL CARRIAGE, AND DRIVE MECHANISM THEREOF

BACKGROUND OF THE INVENTION

1. Field of the Invention

The present invention relates to a handy sketching apparatus, or more specifically to the handy sketching apparatus which has an image information reading function and a sketching function to draw an image on the basis of the image information read by the image information reading function.

2. Description of the Prior Art

The conventional apparatus of this kind is disclosed in the Japanese Patent Laid Open Publication No. SH061-32183.

The handy sketching apparatus as disclosed in the above publication uses a sheet stationary type XY plotter with a sketching function to draw an image on the basis of image information. The image is drawn on a sheet such as a tracing paper by a writing pen as a drawing utensil of the XY plotter held by a pen carriage provided in the apparatus. The pen carriage is designed so that the writing pen held by the pen carriage is replaceable with a reading head with an image reading function.

Thus, the conventional handy sketching apparatus is capable of reading image information and drawing an image, sharing the sketching function of the XY plotter.

SUMMARY OF THE INVENTION

As described above, the conventional apparatus basically comprises a sheet stationary type XY plotter having an image information reading function in addition to its intrinsic sketching function. Therefore, to miniaturize the size is rather difficult. In addition, the conventional apparatus has an operational problem. Specifically, the apparatus uses the same surface to read image information and to draw an image. Therefore, after reading the image information on a manuscript, it is necessary to replace the manuscript with a sheet such as a tracing paper on which to draw an image.

An object of the present invention is to solve the above problems by providing a handy sketching apparatus easy to operate and easy to be miniaturized.

To achieve the above object, the handy sketching apparatus according to the present invention comprises:

(a) a base block which contains a progressive scanning image information reading mechanism to read through the bottom face image information placed under the base block sequentially as the apparatus is moved in a sub-scanning direction, and (b) an upper block which is integrally formed on the top side of the base block, straddling a sheet carrying path provided on the top surface of the base block, the upper block containing a traveling mechanism which is run back and forth in a main-scanning direction across the sheet carrying path, thereby moving a drawing utensil to draw an image on a sheet being carried back and forth on the sheet carrying path in a specified direction substantially parallel to the bottom face of the base block, on the basis of the image information read by the image information reading mechanism.

The action of the handy sketching apparatus of the present invention is as follows.

As the apparatus is moved in the sub-scanning direction, the image information reading mechanism in the base block of the apparatus reads serially through the bottom face of the base block the image information on a manuscript placed under the apparatus by progressive scanning.

According to the image information thus read by progressive scanning, the traveling mechanism in the upper block moves the drawing utensil to draw a corresponding image on a sheet on the sheet carrying path formed on the top surface of the base block under the upper block, while the sheet is carried in the specified direction substantially parallel to the bottom face of the base block.

Thus, the sketching apparatus according to the present invention is of a sheet-moving type that draws an image on a sheet being carried on the sheet carrying path, on the basis of the image information read serially as the apparatus is moved in the sub-scanning direction. Therefore, unlike a sheet stationary type apparatus, the apparatus of the present information is readily miniaturized in size regardless of the size of manuscripts and drawing sheets to be used.

In addition, the sketching apparatus of the present invention reads the image information on a manuscript through the bottom face of the base block and draws a corresponding image on a drawing sheet carried on the sheet carrying path formed on the top surface of the base block, thus eliminating the troublesome operation of replacing a manuscript with a drawing sheet. That is, the operability is improved.

In an embodiment of the present invention, the image information reading mechanism may include:

(a) an optical system for projecting the image information read through the bottom face of the base block, (b) an image sensor for temporarily storing the image information projected by the optical system sequentially as the apparatus is moved in the sub-scanning direction, and (c) a moving speed detector which detects the moving length of the apparatus moved in the sub-scanning direction, thus permitting the image information reading mechanism to write in a memory the image information which is temporarily stored in the image sensor sequentially in proportion to the moving length of the apparatus.

The traveling mechanism in an embodiment of the invention may contain:

(a) a carriage for holding the drawing utensil so as to enable a move up and down, (b) a guide shaft(s) for guiding the carriage in the main scanning direction, and (c) a belt engaged with the carriage and driven by a motive power so as to move the carriage back and forth along the guide shaft(s) in the main scanning direction.

Furthermore, to carry the sheet forward and backward in the specified direction, the sketching apparatus of the present invention is provided with (a) a driving wheel(s) rotated by means of a motive power, and (b) a driven wheel(s) facing the driving wheels, respectively.

The sheet is carried back and forth in a specified direction as being clamped between the driving wheel(s) and driven wheel(s).

Here, in the case where a sheet is carried back and forth on the sheet carrying path in the same direction as the apparatus is moved for reading image information as is in the present invention, a first motor as the motive power for driving the belt and a second motor as the motive power for rotating the driving wheel(s) are preferably located on the right and left sides across the sheet carrying path. Such arrangement of the motors balances the weight of the entire apparatus, ensuring smooth movement of the apparatus in reading image information.

Furthermore, it is desirable to form an inspection window in the base block so that image information placed under the base block can be viewed from the above through the window. Through this inspection window, an operator can check the width of the image information to be read, ensuring accurate reading.

The drawing utensil used in the apparatus may be a writing pen or a cutting pen.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 through 4(B) are drawings for explaining an embodiment of the handy sketching apparatus according to the present invention:

FIG. 1 is a perspective view of the entire apparatus,

FIG. 2 is a exploded perspective view of the apparatus,

FIG. 3 is a vertical sectional view along the line III—III in FIG. 1, and

FIGS. 4(A) and 4(B) are drawings for explaining the operating procedure of the handy sketching apparatus of the present invention.

DESCRIPTION OF THE PREFERRED EMBODIMENT

An embodiment of the handy sketching apparatus according to the present invention is described below with reference to the accompanying drawings.

Figure 1:
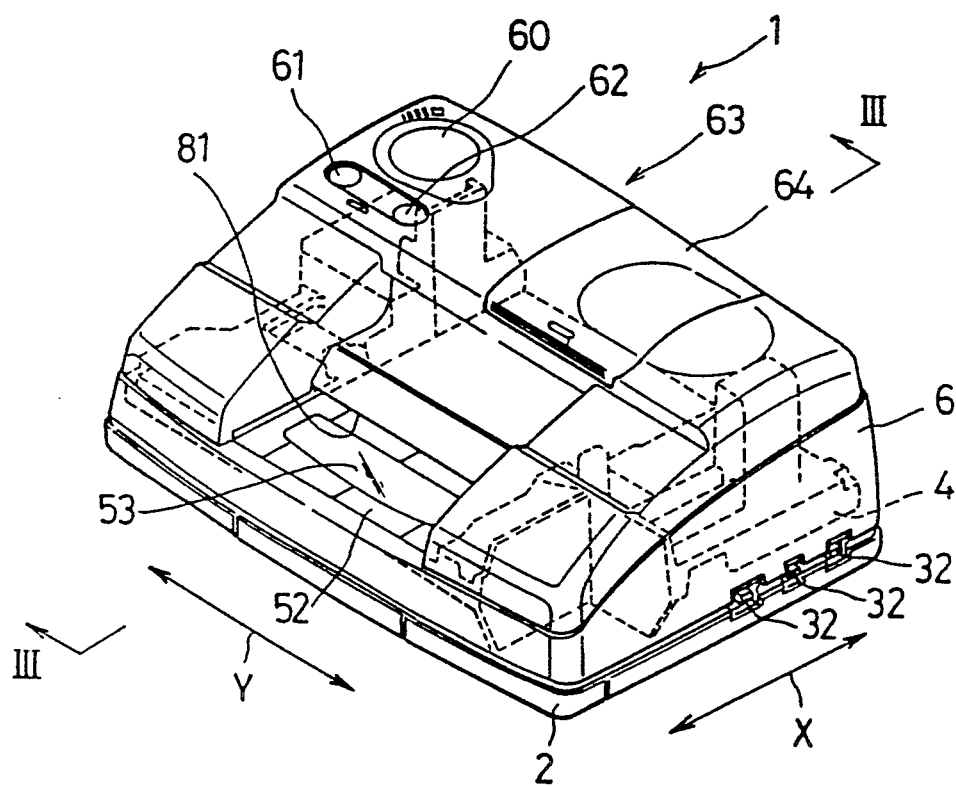
Figure 2:
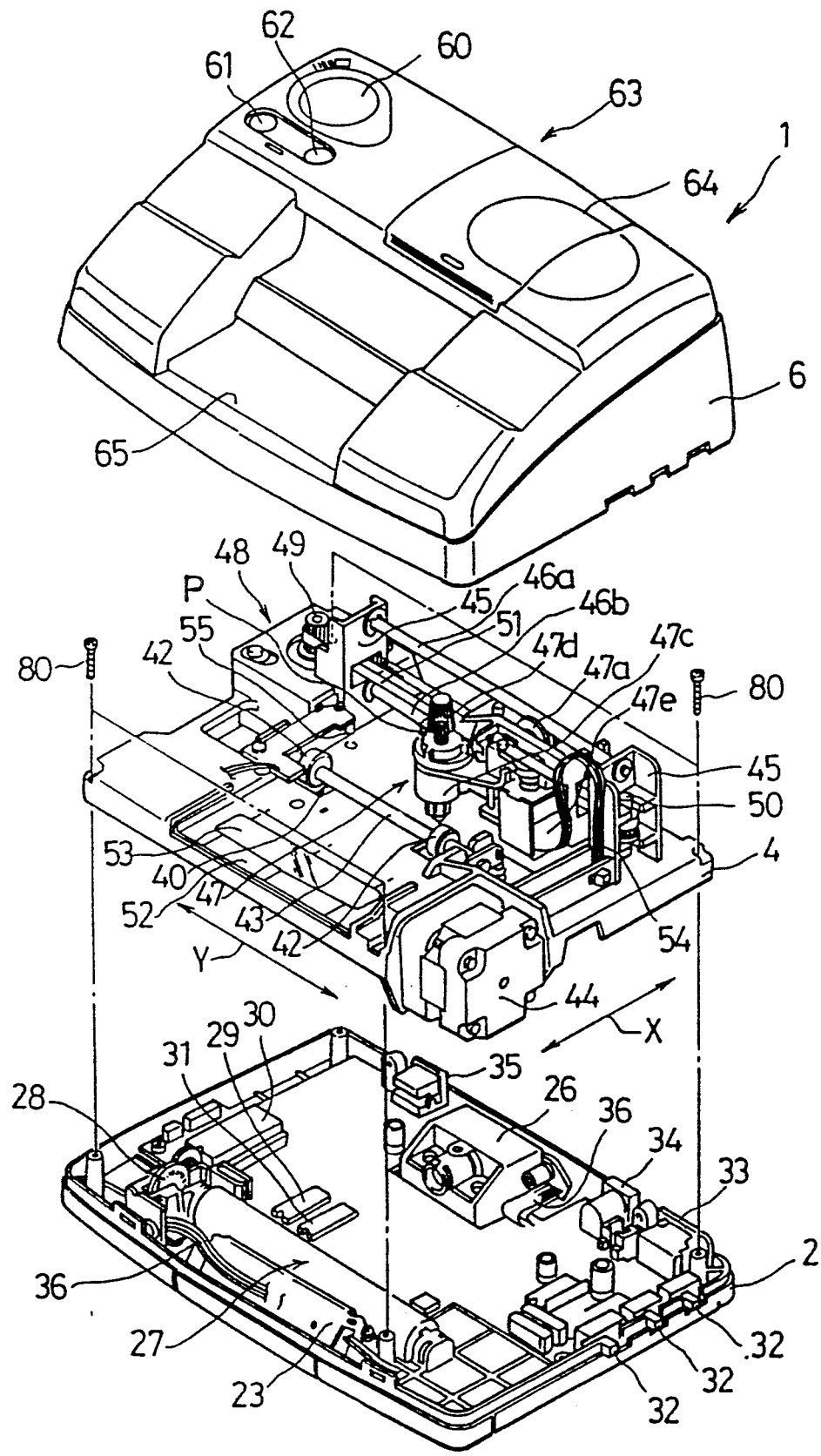

Referring to FIGS. 1 through 3, a handy sketching apparatus 1 comprises a bottom cover 2, an auxiliary cover 4 and an upper cover 6 all assembled in one body.

As shown in FIG. 3, the bottom cover 2 has a LED board 23 and a CCD camera 26. The LED board 23 contains a LED lamp 21 for illuminating the surface of a manuscript M which carries the image information through an opening 20 formed in the bottom cover 2, and a mirror 22 for reflecting the incident light which is reflected by the surface of the manuscript M illuminated by the LED lamp 21. The CCD camera 26 comprises a focusing lens 24 for focusing the light reflected by the mirror 22 and a CCD element 25 which is an image sensor that stores the projected image information temporarily. The reflecting mirror 22 and the focusing lens 24 constitute an optical system which projects the light reflected from the image information-carrying surface of the manuscript M or, in other words, the image information onto the CCD element 25. The bottom cover 2 also contains a roller 27 which is in contact with the image information-carrying surface of the manuscript M, as shown in FIG. 3, and therefore rotates as the apparatus 1 is moved in the X direction indicated by the arrow or namely in a sub-scanning direction, and an encoder 28 shown in FIG. 2 which rotates in synchronization with the rotation of the roller 27. The encoder 28 generates pulse proportional to the rotational amount of the roller 27. The roller 27 and the encoder 28 constitute a moving length detector which detects the moving length of the apparatus 1 moved in the sub-scanning direction.

Thus, the image information projected and temporarily stored in the CCD element 25 is output in form of image signals from the element 25 in synchronization with the pulse generated by the encoder 28 whereby the image information are read by progressing scanning. The image signals are written and saved serially in a random-access-memory (RAM) 29 as a bit map memory which is provided on the bottom cover 2.

Also, there are provided, on the bottom cover 2, a read-only-memory (ROM) 30 for storing various programs including an image-processing control program, and a microprocessor 31 which performs arithmetic operations according to the various programs. Reference number 32 denotes setting switches for setting whether or not a stored image information is to be enlarged when drawn, the magnification of enlargement, and the adjustment of the depth of colour on reading, respectively. Reference number 33 denotes a power switch, 34 a power connector, 35 an AUX terminal, and 36 wiring.

As shown in FIG. 3, the auxiliary cover 4 has a driving shaft 41 on its bottom side in such a position. The axis of the driving shaft 41 is directed in the Y direction indicated by the arrow, or namely in the direction intersecting the X direction. Driving rollers 40 and 40 are fit in the end portions, respectively, of the driving shaft 41. A driven shaft 43 is provided on the top side of the auxiliary cover 4, with the axis of the shaft 43 also directed in the Y direction. Driven rollers 42 and 42 are which are provided on the opposite side of the driving rollers 40, 40 fit in the end portions of the driven shaft 43 so that they mate with the driving rollers, respectively. Though not shown, a sheet carrying belt is looped between the driving shaft 41 and the rotary shaft of a sheet driving motor 44 so that the driving shaft 41 is rotated by means of the sheet driving motor 44. Thus, a writing or cutting sheet S is carried in the X direction as it is clamped(hold) between the driving rollers 40 and 40 rotated together with the driving shaft 41 and the driven rollers 42 and 42 rotated by the driving rollers 40 and 40, as shown in FIG. 3.

Furthermore, the auxiliary cover 4 has a pair of guide shafts 46a and 46b which are provided up and down with their axes parallel to the Y direction and supported at both ends by supporting plates 45 and 45. A carriage 47 is suspended on the guide shafts 46a and 46b by engagement with the upper guide shaft 46a via a guide roller 47a provided on the carriage 47, and by engagement with the lower guide shaft 46b which penetrates through a guide hole 47b formed in the carriage 47 as shown in FIG. 3. Accordingly, the carriage 47 is movable in the Y direction or namely in a main scanning direction.

In addition to the guide roller 47a and the guide hole 47b, the carriage 47 has a bracket 47c in which insert a cutting or writing pen P as a drawing utensil, a clamping screw 47d for fixing the pen P which is mounted on the flange portion of the pen P to prevent it from coming off the bracket 47c, and a plunger 47e which moves up and down the bracket 47c together with the pen P. A carriage moving belt 51 is looped between the rotary shaft 49 of a carriage driving motor 48 located on one side of the carriage 47 and a driven shaft 50 located on the other side of the carriage 47, along the Y direction. The carriage 47 has an engaging portion (not shown) for engagement with the carriage moving belt 51, so that it is moved in the Y direction along the guide shafts 46a and 46b. Reference number 54 denotes wiring.

The sheet S is carried in the X direction on a sheet carrying path 52 as clamped between the driving rollers 40 and 40 on the driving shaft 41 provided on the top side of the auxiliary cover 4 and the driven rollers 42 and 42 on the driven shaft 43 provided on the bottom side of the auxiliary cover 4. A light-transmitting inspection window 53 made of, for instance, an acrylic plate is provided in the sheet carrying path 52, so that the image information-carrying surface of the manuscript M can be viewed from above, as shown in FIG. 3. This window 53 permits an operator to locate the image information-carrying surface of the manuscript M when the LED lamp 21 is lit. The sheet driving motor 44 and the carriage driving motor 48 are arranged in diagonal positions against the sheet carrying path 52 as shown, for balancing the weight of the apparatus 1 and for smooth movement of the apparatus 1 in reading the image information on the manuscript M. Reference number 55 denotes a sheet sensor for detecting the sheet S being inserted onto the sheet carrying path 52.

The upper cover 6 is provided with a scanning button 60 being used for instructing the scanning of the manuscript M, including an instruction on turning on the LED lamp 21, a stop/ejector button 61 to instruct the stoppage of the drawing operation and the ejection of the sheet, and a trimming button 62 to select the width of image information to be read on the manuscript M. A manual grip 63 is formed in the rear half portion of the upper cover 6. The apparatus 1 is moved manually by this grip 63 in the X direction. Reference number 64 denotes a cover which is to be opened when a pen P is inserted in the bracket 47c of the carriage 47 or is replaced, and 65 denotes an opening.

The bottom cover 2, auxiliary cover 4 and upper cover 6 are fit in and connected with one another by machine screws 80 to obtain the handy sketching apparatus 1 shown in FIGS. 1 and 3. According to the present invention, the lower half portion of the apparatus 1 between the top surface of the auxiliary cover 4 and the bottom surface of the bottom cover 2 constitutes a base block, and the upper half portion between the top surface of the auxiliary cover 4 and the top surface of the upper cover 6 constitutes an upper block. When the bottom cover 2, auxiliary cover 4 and upper cover 6 are assembled in the method described above, a slit 81 is formed between the auxiliary cover 4 and the upper cover 6, or in other words, between the base block and the upper block in a position corresponding to the sheet carrying path 52, as shown in FIG. 3. That is, the upper block straddles the sheet carrying path 52.

In the handy sketching apparatus 1 described above, the operation to read the image information on the manuscript M and to save image signals in the RAM 29 by the CCD element 25 and encoder 28, and to draw on the sheet S by driving the motor 44 for sheet carrying and the motor 48 for carriage moving on the basis of the image signal stored in the RAM 29 are controlled by the microprocessor 31 which carries out arithmetic operations according to the various programs stored in the ROM 30.

Figure 4A:
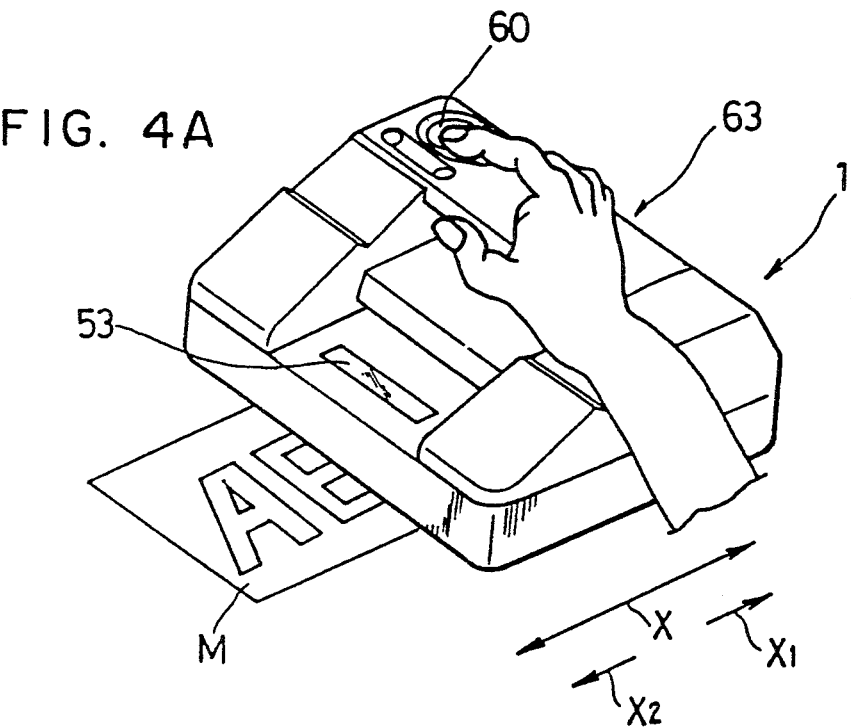

Now, the operation of the handy sketching equipment 1 constructed above is described with reference to FIGS. 4(A) and 4(B). For this description, it is assumed that the sheet S is a cutting sheet of double-layered structure composed of a ground paper and a polyvinyl chloride (PVC) film lined with an adhesive layer for adhesion to the ground paper, and that the pen P mounted on the carriage 47 is a cutting pen.

An operator connects a power plug to the power connector 34, turns ON the power switch 33, and operates the setting switches 32 and trimming button 62 for specified settings. The operator then places the apparatus 1 on the image information-carrying surface of a manuscript M as shown in FIG. 4(A), and depresses the scanning button 60 to turn on the LED lamp 21. While checking the position of the image information to be read on the manuscript M through the light-transmitting inspection window 53, the operator moves the apparatus 1 in the X direction, or namely the sub-scanning direction by gripping the manual grip 63, with the scanning button 60 kept depressed. As the apparatus 1 is moved, the image information is projected through the reflecting mirror 22 and focusing lens 24 onto the CCD element 25. The image information thus stored in CCD element 25 is written in the RAM 29 as an image signal in response to the pulse generated by the encoder 28 which is proportional to the moving length of the apparatus 1, serially for each line in the main scanning direction. When the necessary portion of the image information has been read, the operator releases the scanning button 60 to terminate the reading operation. If the apparatus 1 is moved in the backward $X_2$ direction opposite to the forward $X_1$ direction of the X, the image information is read inversely as if the information reflected on the mirror were read.

Figure 4B:
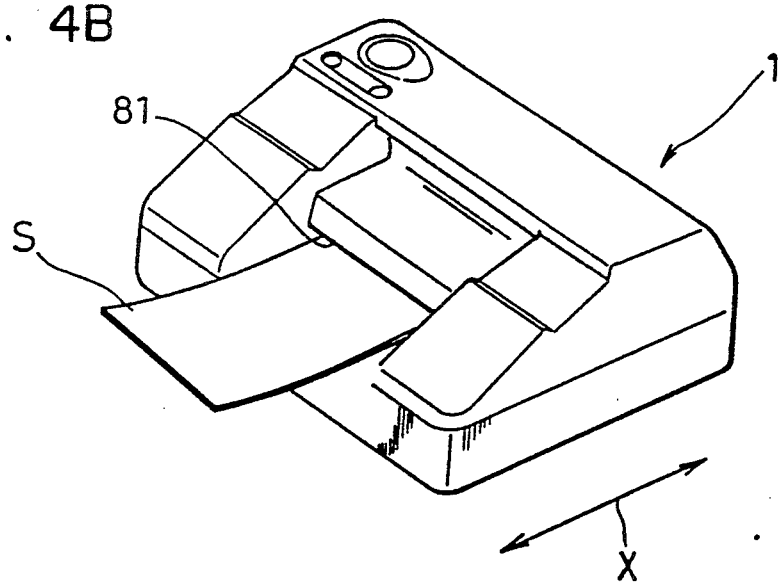

Then, the operator inserts a cutting sheet S through the slit 81 with the PVC side facing up, as shown in FIG. 4(B). As the sheet sensor 55 detects the cutting sheet S, the sheet driving motor 44 is actuated to rotate the driving shaft 41 and therefore the driving rollers 40 and 40. Thus, the cutting sheet S is carried to the specified position, being clamped between the driving rollers 40 and 40 and driven rollers 42 and 42. Then, the microprocessor 31 controls the sheet driving motor 44, carriage driving motor 48 and plunger 47e to carry the cutting sheet S back and forth in the X direction, the carriage 47 back and forth in the Y direction, and the bracket 47c and cutting pen P up and down, on the basis of the image signals stored in the RAM 29 according to the program. Thus, the pen P cuts the PVC film on the cutting sheet S. As a result, the stored image information is drawn.

Needless to say, a normally drawn image can be obtained by using a writing sheet such as a tracing paper instead of the cutting sheet as a sheet S, and a writing pen such as an ink pen or a mechanical pencil instead of the cutting pen as a pen P.

As described above, according to the present embodiment of the invention, the apparatus 1 is moved manually. Alternatively, it may be moved automatically with the roller 27 driven by a motor. According to the present embodiment, the image information read is stored temporarily in form of image signals in the RAM 29.

Instead, the image information may be reproduced directly on the sheet S as it is read.

Furthermore, according to the present embodiment of the invention, the sheet carrying path 52 is arranged to carry the sheet S in the X direction. The sheet carrying path 52 may be arranged to carry the sheet S in the Y direction. In such a case, the arrangement of the traveling mechanism including the carriage 47 for moving the pen P must be changed accordingly, as will be understood by those skilled in the art.

The invention being thus described, it will be obvious that the same may be varied in may ways. Such variations are not to be regarded as a departure from the spirit and scope of the invention, and all such modifications as would be obvious to those skilled in the art are intended to be included within the scope of the following claim.

What is claimed is:

1. A handy sketching apparatus comprising:
   (a) a base block which contains an image information reading mechanism for reading, through a bottom face, image information, placed under the base block, sequentially as the apparatus is moved in a sub-scanning direction; and
   (b) an upper block which is integrally formed on the top side of the base block, straddling a sheet carrying path provided on a top surface of the base block, the upper block containing a traveling mechanism which is run back and forth in a main scanning direction across the sheet carrying path, thereby moving a drawing utensil to draw an image on a sheet on the basis of the image information read by the image information reading mechanism, said sheet being carried back and forth on the sheet carrying path in a specified direction substantially parallel to the bottom face of the base block.

2. A handy sketching apparatus as described in claim 1 wherein said image information reading mechanism comprises:
   (a) an optical system for projecting the image information read through the bottom face of the base block,
   (b) an image sensor for temporarily storing the image information projected by the optical system sequentially as the apparatus is moved in the sub-scanning direction, and
   (c) a moving amount detector for detecting the moving length of the apparatus in the sub-scanning direction, thus permitting the image information reading mechanism to write in a memory the image information which is temporarily stored in the image sensor sequentially in proportion to the moving length of the apparatus.

3. A handy sketching apparatus as described in claim 1 or 2 wherein said traveling mechanism comprises:
   (a) a carriage for holding the drawing utensil so as to enable a move up and down,
   (b) a guide shaft means for guiding the carriage in the main scanning direction, and
   (c) a belt engaged with the carriage and driven by a motive power so as to move the carriage back and forth along the guide shaft means in the main scanning direction.

4. A handy sketching apparatus as described in claim 3, further comprising:
   (a) a driving wheel rotated by means of a motive power, and
   (b) a driven wheel facing said driving wheel(s), so that the sheet is carried back and forth in a specified direction as it is clamped between said driving wheel and driven wheel(s).

5. A handy sketching apparatus as described in claim 4 wherein said specified direction is the direction in which the apparatus reads the image information.

6. A handy sketching apparatus as described in claim 5 wherein said motive power for driving the belt is a first motor and said motive power for rotating the driving wheel is a second motor, the first and second motors being arranged on a right and left side across the sheet carrying path.

7. A handy sketching apparatus as described in claim 1, 2, 4, 5 or 6 wherein a slit is formed between said base block and said upper block at a position corresponding to said sheet carrying path.

8. A handy sketching apparatus as described in claim 1, 2, 4, 5 or 6 wherein said base block is provided with an inspection window through which to view the image information placed under the base block from above.

9. A handy sketching apparatus as described in claim 1, 2, 4, 5 or 6 wherein said upper block is provided with a grip by which to move the apparatus in the sub-scanning direction.

10. A handy sketching apparatus as described in claim 1, 2, 4, 5 or 6 wherein said drawing utensil is a cutting pen or a writing pen.

* * * * *

UNITED STATES PATENT AND TRADEMARK OFFICE
CERTIFICATE OF CORRECTION

PATENT NO. : 5,124,801
DATED : June 23, 1992
INVENTOR(S) : F. SHINMURA et al.

It is certified that error appears in the above-indentified patent and that said Letters Patent is hereby corrected as shown below:

At column 8, line 7 (claim 3, line 2), delete "or 2".
At column 8, line 34 (claim 7, line 2), delete "2, 4, 5 or 6".
At column 8, line 38 (claim 8, line 2), delete "2, 4, 5 or 6".
At column 8, line 42 (claim 9, line 2), delete "2, 4, 5 or 6".
At column 8, line 46 (claim 10, line 2), delete "2, 4, 5 or 6".
At column 8, line 20 (claim 4, line 5), change "wheel(s)" to ---wheel---.
At column 8, line 23 (claim 4, line 8) change "wheel(s)" to ---wheel---.

Signed and Sealed this

Twentieth Day of September, 1994

Attest:

Attesting Officer

BRUCE LEHMAN

Commissioner of Patents and Trademarks